Jan. 30, 1945.  S. B. HELLSTROM  2,368,359
TAPPING HEAD
Filed Sept. 5, 1941  6 Sheets-Sheet 1

INVENTOR
Sven B. Hellstrom.
BY
ATTORNEYS.

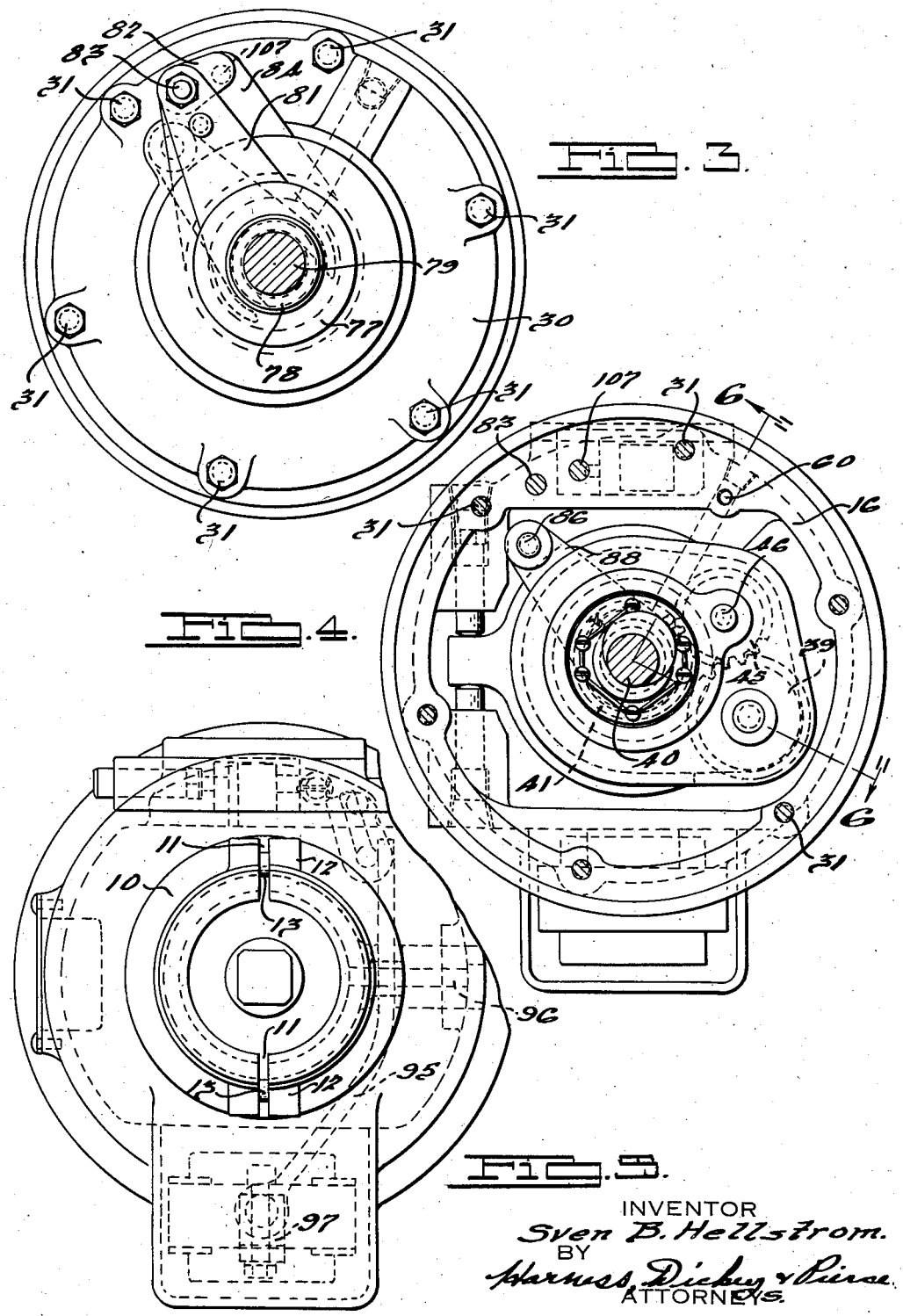

Jan. 30, 1945.  S. B. HELLSTROM  2,368,359
TAPPING HEAD
Filed Sept. 5, 1941  6 Sheets-Sheet 3

INVENTOR
Sven B. Hellstrom.
BY
Harness, Dickey & Pierce
ATTORNEYS.

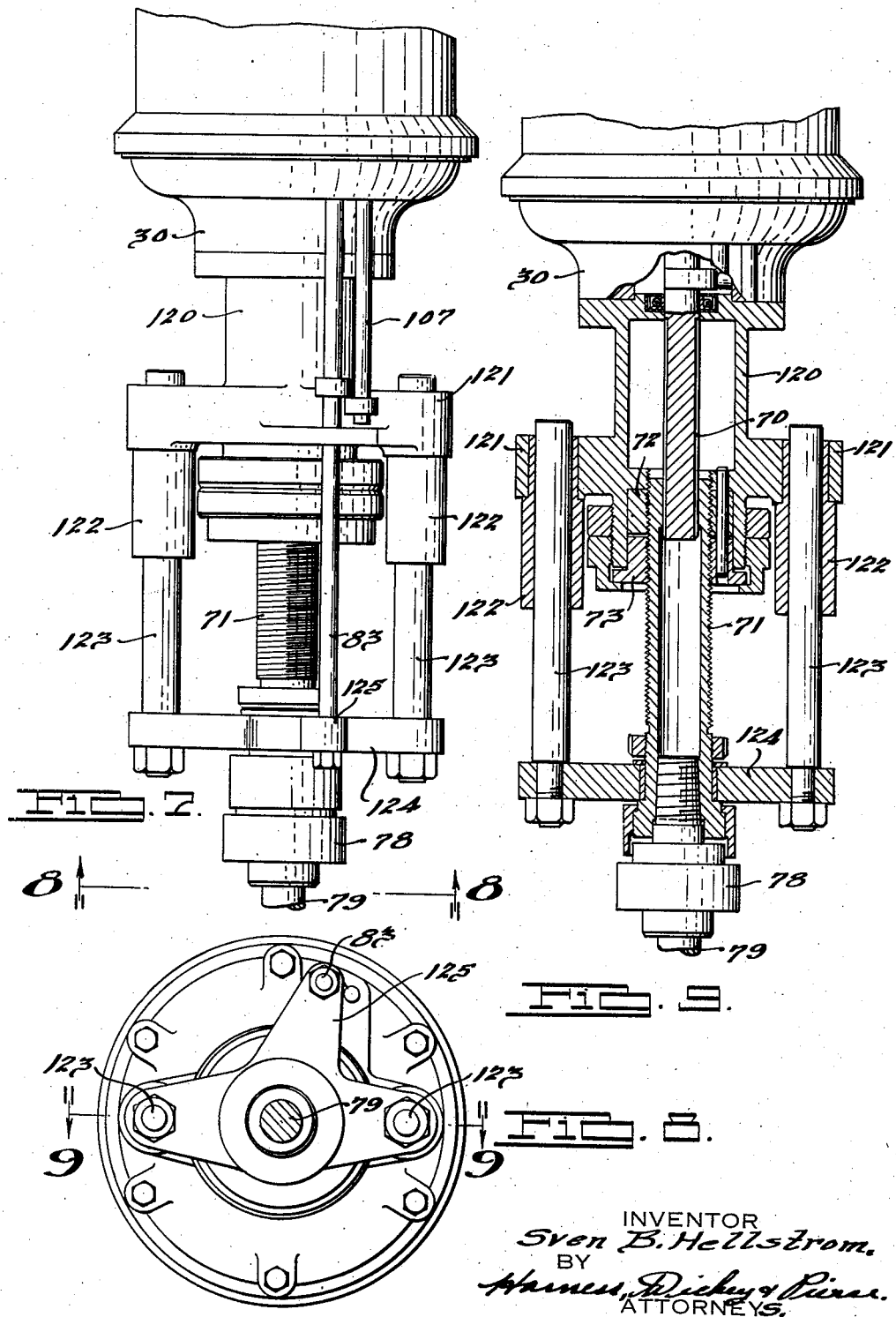

Jan. 30, 1945.   S. B. HELLSTROM   2,368,359
TAPPING HEAD
Filed Sept. 5, 1941   6 Sheets-Sheet 5
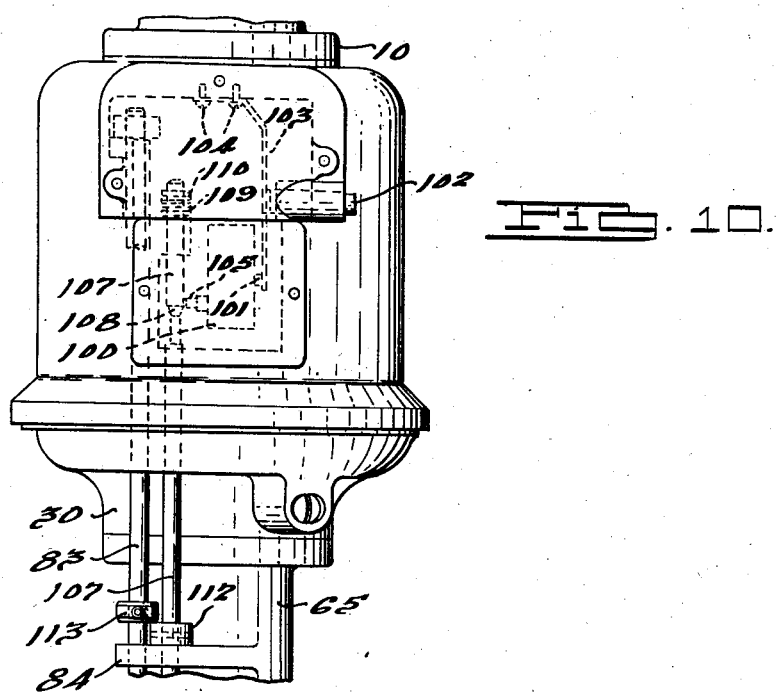
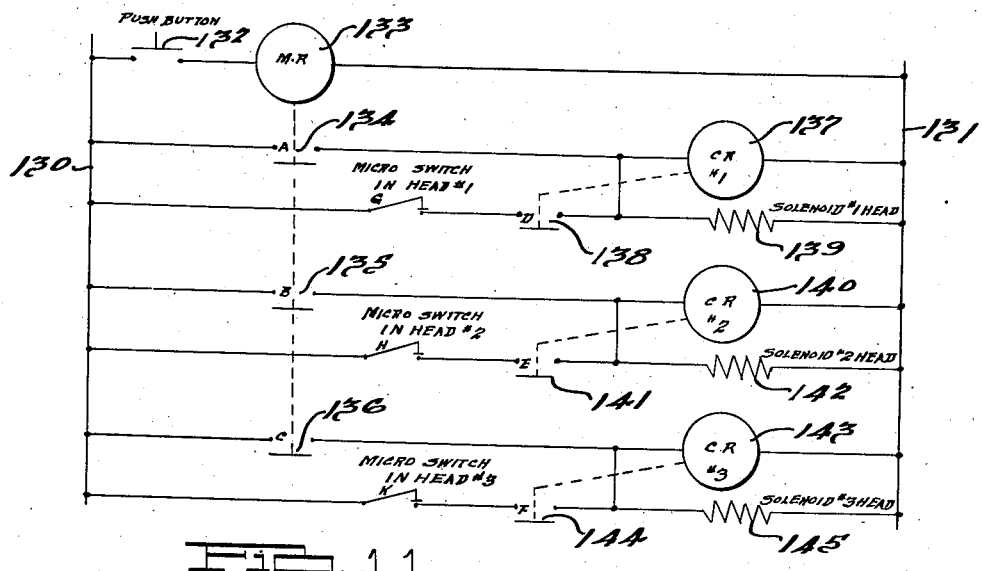
INVENTOR
Sven B. Hellstrom.
BY
ATTORNEYS.

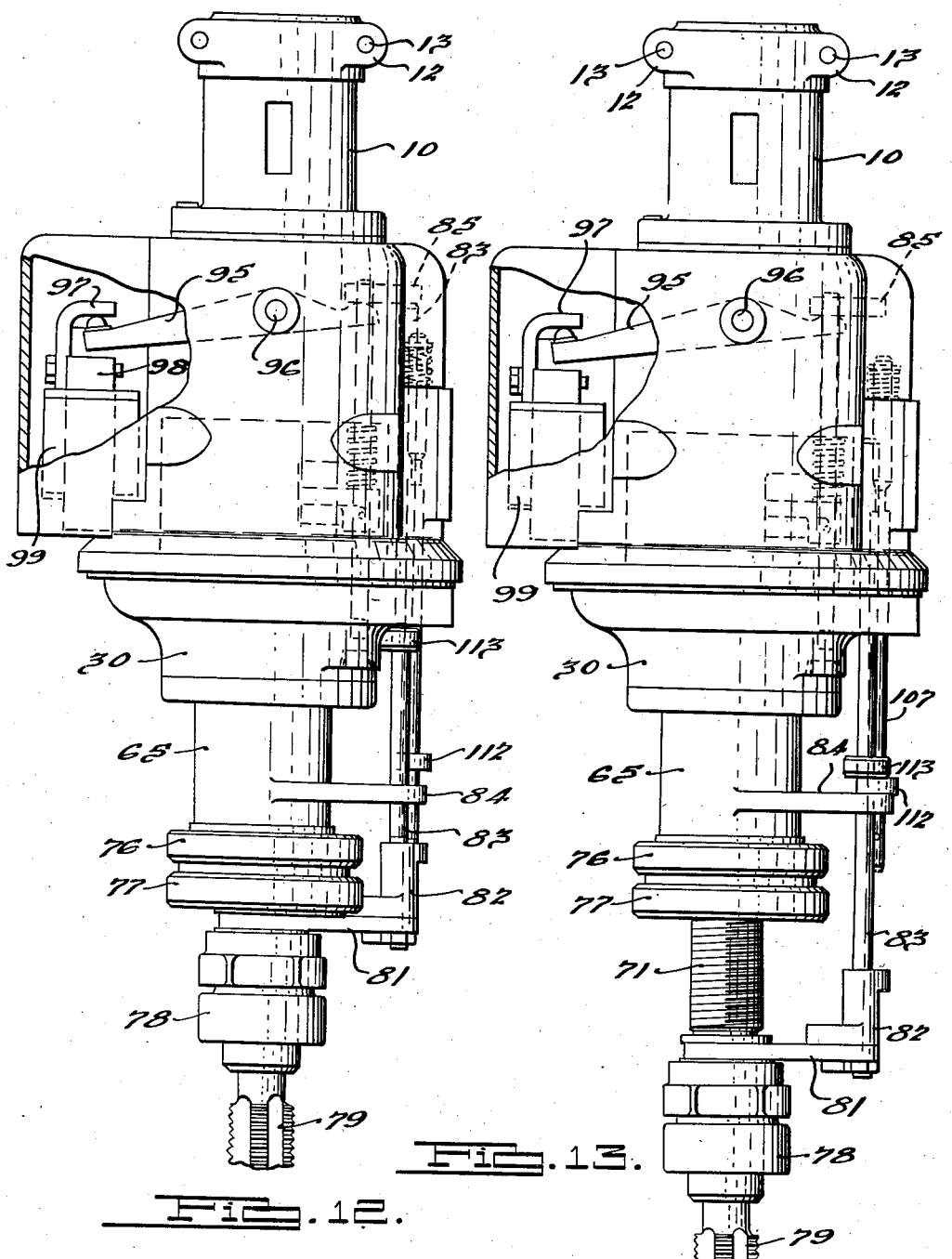

Patented Jan. 30, 1945

2,368,359

UNITED STATES PATENT OFFICE 2,368,359

TAPPING HEAD

Sven B. Hellstrom, Grosse Pointe Farms, Mich., assignor to Detroit Tap & Tool Company, Detroit, Mich., a corporation of Delaware Application September 5, 1941, Serial No. 409,631

8 Claims. (Cl. 10—136)

The present invention relates generally to apparatus for cutting screw threads interiorly of holes or openings.

While the primary object of the present invention is to provide a simple, compact, rugged, and precise tapping head construction primarily intended for use as an attachment for a drill press or turret lathe, it will become readily apparent from the following description that many of the novel features of the present construction are especially suited to tapping machines generally, irrespective of whether these novel features are incorporated in a unitary tapping head construction or in a machine designed solely for thread tapping operations.

The primary object of the present invention is to provide a tapping head construction in which the feed of the tap, both to and from the work, is accurately and precisely controlled by means of a lead screw in order to eliminate, insofar as is possible, errors in the thread cutting operation.

Still further, the present invention contemplates the provision of substantially automatic means for controlling the depth of cut of the tap together with means for automatically reversing the direction of rotation of the tap spindle when a predetermined depth is reached.

Still further, the invention contemplates the provision of simple, convenient and easily adjustable electrical control mechanism for accurately and automatically controlling the feed of the tap spindle both to and from the work.

Still another object of the present invention consists in the provision of a novel and improved electrical control mechanism. This novel electrical control mechanism makes possible the simultaneous operation of a plurality of tapping machines or a plurality of tapping heads in such a way that a plurality of holes may be simultaneously tapped. The improved control system of the present invention is sufficiently flexible in its operation so that the plurality of holes being simultaneously tapped may be of different depth, may have different pitch threads, and yet at the same time all holes may be simultaneously tapped and each individual tap will cut the proper threads to the proper depth, automatically reverse and return to its initial position entirely independently of the operation of the other taps.

Still another important feature of the present invention contemplates the provision of a tapping head construction which is compact and adaptable as a unit to a drill press, turret lathe, or similar machine tool and in which the feed of the spindle is controlled by a lead screw located closely adjacent the tap itself, thereby materially decreasing errors due to wind-up in the tap spindle and at the same time greatly increasing the accessibility of the lead screw in order to facilitate changes thereof when changes of taps are made.

An important feature of the present invention resides in the provision of means for drivingly interconnecting the source of power with the tap spindle in such a manner as to eliminate any axial thrust on the tap or tap spindle in order to establish a driving engagement between the source of power and the tap spindle.

Still another feature of the present invention consists in the provision of a tapping machine or tapping head construction in which the tap spindle is not only accurately and precisely controlled by means of a lead screw but in which the tap and tap spindle are rotated only at such times as the tap is actually entering or leaving the work.

Many other and further objects, advantages, and features of the present invention will become more clearly apparent from the following specification when considered in connection with the accompanying drawings forming a part thereof.

In the drawings:

Figure 3 is a transverse, sectional view taken substantially along the lines 3—3 of Figure 2, looking upwardly toward the tapping head construction in the direction indicated by the arrows.

Figure 4 is a transverse, sectional view taken substantially along the line 4—4 of Figure 1, illustrating the internal construction and arrangement of parts.

Figure 6 is a vertical, axial, sectional view taken substantially along the line 6—6 of Figure 4, illustrating in detail the internal construction and arrangement of parts.

Figure 7 is a fragmentary, front elevational view of a modified form of the present invention illustrating a form of the invention particularly adaptable for use in deep hole tapping.

Figure 8 is a transverse, sectional view taken substantially on the line 8—8 of Figure 7.

Figure 9 is a vertical, sectional view with parts broken away showing in detail the modified form of the invention disclosed in Figures 7 and 8.

Figure 10 is a fragmentary, side elevational view of the switch control mechanism, illustrating in detail the manner in which the feed control of the tapping head operates.

Figure 11 is a circuit diagram illustrating one manner in which a plurality of tapping heads or tapping machines may be simultaneously controlled.

Figure 12 is a side, elevational view similar to Figure 1, illustrating in further detail the operation of the control mechanism.

Figure 13 is a side, elevational view similar to Figures 1 and 12, illustrating the control mechanism in still further detail.

Figures 1, 2:
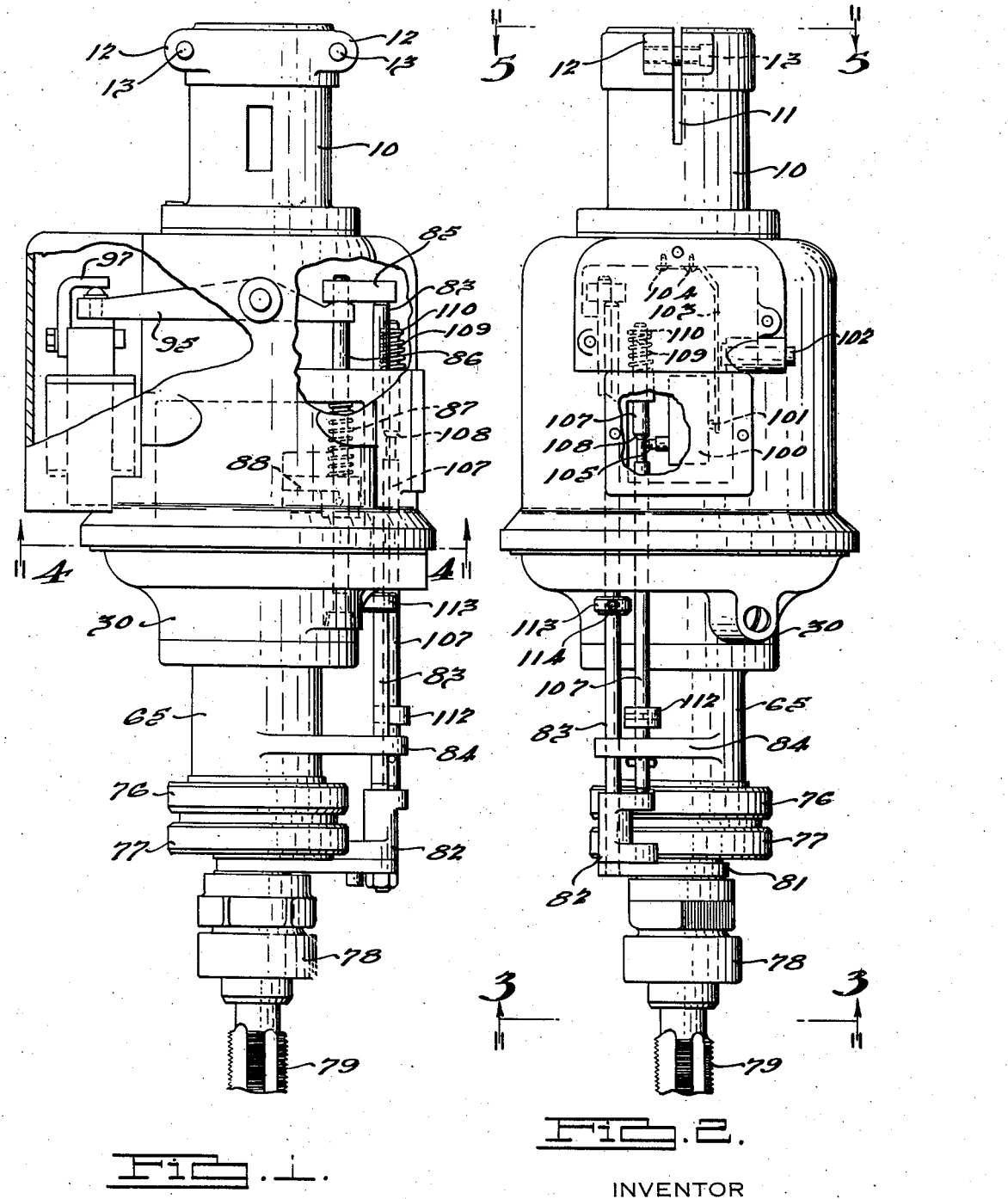
Figure 1 is a front elevational view of a tapping head designed and intended for use as an attachment to a drill press or similar piece of equipment.
Figure 2 is a side elevational view of the specific form of tapping head construction illustrated in Figure 1.
Figure 5:
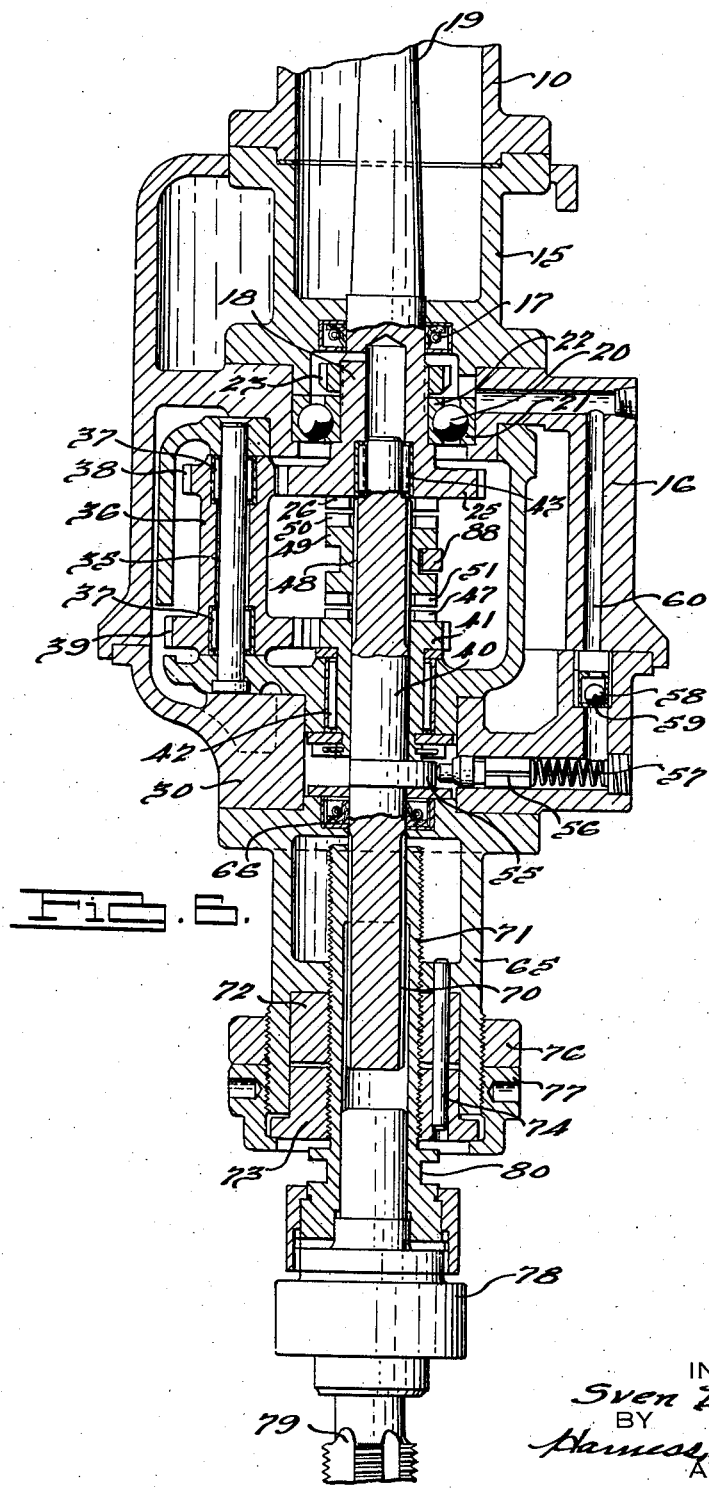
Figure 5 is a top plan view taken along the line 5—5 of Figure 2, looking downwardly from the upper end of the tapping head construction.

With more particular reference to the drawings, it will be readily appreciated that only one specific embodiment of the invention has been illustrated and described in detail and it will be likewise appreciated that many and various modifications of this specific form of the invention may be made as circumstances require without departing from the generic spirit of the invention as set forth in the subjoined claims.

With more particular reference to the drawings, the unitary tapping head construction disclosed comprises an adapter collar 10 which is slotted at 11 and provided with bosses 12 which are at diametrically opposite sides. Suitable machine screws 13 extend through the bosses 12 and may be tightened up to lock the tapping head constructions as a whole in predetermined position upon a drill press or other suitable apparatus.

The collar 10 is suitably attached to a second collar or bearing housing cap 15 which in turn is securely fastened to the upper portion 16 of the main housing of the tapping head. The collar 15 has mounted therein an annular oil seal 17 of conventional construction which serves to surround the main drive shaft 18. The main drive shaft 18 is provided with a conventional taper shank 19 which extends axially upwardly within the collar members 15 and 10. This shaft 19 is journalled for rotation in an annular series of ball bearings 20 mounted on a raceway 21 carried by the upper portion of the main housing 16. The opposite raceway 22 for the ball bearings 20 is firmly anchored to the shaft 18 by means of a suitable lock nut 23, this construction all being clearly illustrated in Figure 6 of the drawings.

Integrally formed on the lower end of the shaft 18 is a gear 25 which on its lower axial face is provided with a series of clutch teeth 26, the purpose and function of which will be more clearly described hereinafter.

The lower half 30 of the main housing of the tapping head construction is bolted to the upper half 16 of the housing by means of an annular series of bolts 31. A suitable counter-shaft 35 is mounted in the housing on an axis parallel to the shaft 18. This counter-shaft provides means for journalling a gear cluster 36 on suitable sets of needle bearings 37 in order that the gear cluster 36 will be freely rotatable on an axis parallel to the axis of the shaft 18. The gear cluster 36 comprises upper and lower gears 38 and 39, the upper gear 38 being in meshing engagement with the gear 25 which, as has been described above, is integrally connected to the lower end of the shaft 18. An intermediate shaft 40 has journalled thereon intermediate its ends a collar pinion 41. This shaft 40 and the collar gear 41 are journalled for rotation in a suitable roller bearing assembly 42 and, as is clearly seen in Figure 6, are mounted for rotation on an axis which coincides with the axis of the rotation of the shaft 18. The extreme upper end of the shaft 40 is of reduced diameter and is journalled in a second series of roller bearings 43 mounted within the hollow lower end of the shaft 18. As is seen best in Figure 4 of the drawings, the collar pinion 41 meshes with an idler pinion 45 journalled for rotation on a suitable shaft 46, the pinion 45 being in meshing engagement with the gear 39 on the lower end of the gear cluster 36. The upper axial face of the collar pinion 41 is provided with clutch teeth 47, the purpose and function of which will hereinafter become clear.

The upper portion of the shaft 40 is provided with axially extending splines 48 which serve to mount a clutch collar 49 which has the upper and lower axial faces thereof provided with clutch teeth 50 and 51, respectively, and it will be clear that the mounting of this collar on the shaft 40 by means of the splines 48 serves to permit free axial shifting of the collar without disturbing the driving engagement between the collar 49 and the shaft 40. It will further be seen that the clutch teeth 50 are adapted to drivingly engage with the clutch teeth 26 when the collar is shifted upwardly and the clutch teeth 51 are adapted to drivingly engage with the clutch teeth 47 when the collar is shifted downwardly. It is likewise clear by reference to Figure 6 that the clutch collar 49 may be maintained in an intermediate position whereby the clutch teeth 50 and 51 are all out of engagement with the clutch teeth 26 and 47.

Immediately below the bearings 42, the shaft 40 is provided with an eccentric cam 55 which upon rotation serves to reciprocate a plunger 56 against a compression coil spring 57. This plunger 56 in combination with the ball valve 58 and seat 59 therefor constitutes an oil pump which serves to circulate lubricating oil around through various ducts 60 in the housing in order that the various bearings and gears will be at all times properly lubricated. Inasmuch as this oil circulation system forms no part of the present invention, further description thereof is unnecessary.

The lower half of the main housing is closed by means of a collar 65 which serves to carry an oil seal 66 of conventional construction surrounding the shaft 40 and serves to enclose and seal the housing in order to prevent the entry of dust or grit therein and at the same time prevent leakage of oil therefrom.

As will be readily appreciated from the foregoing, the taper shank 19 may conveniently be connected to a suitable source of power and during operation of the apparatus this shaft may be constantly rotated. Rotation of the shaft 18 causes constant rotation of the gear cluster 36 about the countershaft 35 and corresponding rotation of the idler gear 45 about its shaft 46. Inasmuch as the idler gear is in meshing engagement with the gear 41 which, as has been described above, is journalled for rotation about the shaft 40, all of these gears will be rotated constantly as long as the taper shank 19 is rotated. It is likewise seen that the gears 25 and 41 rotate on the same axis but in opposite directions. Consequently, it will be appreciated that when the collar 49 is moved axially upwardly along the upper splined portion of the shaft 48, the clutch teeth 50 will engage with the clutch teeth 26 and cause driving engagement between the shaft 40 and the shaft 18. Conversely, downward shifting of the clutch collar 49 will serve to establish driving engagement between the clutch teeth 51 and the clutch teeth 47 integrally formed on the upper axial face of the collar gear 41 thereby establishing driving engagement between the shaft 40 and the collar gear 41.

It will be seen that this downward shifting of the clutch collar 49 will cause rotation of the shaft 40 by the shaft 18. However, due to the fact that the drive in this case is through the idler gear 45, rotation of the shaft 40 will be in a direction opposite from the direction of rotation of the shaft 18.

The lower end of the shaft 40 is provided with axially extending splines 70. These splines serve to drivingly engage a hollow internally splined tap spindle 71 to permit axially downward movement of the tap spindle with respect to the shaft 40 and at the same time maintain a positive driving engagement therebetween.

Mounted in the lower collar 65 is a lead screw assembly which comprises a split lead nut having upper and lower portions 72 and 73, each of which portions is internally threaded. The tap spindle 71 is externally threaded with suitable threads received between portions 72 and 73 of the split lead nut. These portions 72 and 73 of the lead nut are locked against relative rotation with respect to each other by means of a dowel pin 74 and it is seen that this dowel pin extends into a suitable aperture in the housing 65 and so serves the purpose of preventing rotation of the lead nut assembly with respect to the housing.

The lower portion of the housing collar 65 is externally threaded and receives a nut 76 which cooperates with a lock nut collar 77 which overlies the lower face of the lower half 73 of the lead nut assembly. It is readily appreciated that by adjustment of the nuts 76 and 77, the separate portions 72 and 73 of the lead nut may be forced axially toward each other to take up any backlash that may occur in the lead screw and nut assembly.

The lower end of the tap spindle 71 is provided with a conventional chuck assembly 78 which serves to provide easy and convenient means for mounting a tap 79.

From the foregoing description, it will be easily appreciated that when it is desired to tap a hole, a tap spindle having threads thereon corresponding to the lead of the thread of the tap to be used may be assembled with a suitable corresponding lead nut merely by locking the assembly in position by means of the nut 77. Likewise, it will be apparent that as the shaft 40 is rotated, the tap spindle carrying the tap 79 will be fed downwardly toward the work.

By reference to Figure 6, it will be seen that the tap spindle has formed integrally therewith an annular groove 80 adapted to receive a fork 81. This fork 81 is anchored by means of a suitable fitting 82 to the end of a vertically slidable control rod 83 mounted for vertical sliding movement in a boss 84 and in suitable apertures in the housing proper.

As is most clearly seen in Figure 1, the upper end of the rod 83 is adapted to engage a laterally projecting stop member 85 carried by a vertically slidable rod 86 mounted for vertical sliding movement within the housing. The rod 86 has surrounding the same a compression coil spring 87 which has its upper end abutting against the wall of the housing and has its lower end abutting against an inwardly projecting fork 88 which engages the clutch collar 49. This spring 87 and rod 86, therefore, normally tend to force the clutch collar 49 downwardly along the spline shaft 40 and tend at all times to cause the clutch teeth 51 to engage with the clutch teeth 47.

From the construction which is described, it will be apparent that when the tap spindle has reached its downward limit of movement and the clutch teeth 51 and clutch teeth 47 become engaged, the tap spindle will be driven through the idler gear 45 and shaft 40, causing the tap spindle to be rotated in the reverse direction. Rotation of the tap spindle in the reverse direction will cause an upward bodily movement of the spindle due to the engagement of the threads on the exterior surface of the spindle with the lead nut assembly. As the spindle moves upwardly, it will carry with it the fork 81 which sets in the groove 80 and cause a corresponding upward movement of the rod 83. When the tap spindle approaches its upper extreme position of movement, the upper end of the rod 83 will engage the stop member 85. This engagement will cause an upward movement of the rod 86 against the action of the compression coil spring 87.

Upward movement of the rod 86 will cause a corresponding upward movement of the fork 88 and clutch collar 49 associated therewith. Upward movement of the clutch collar 49 will cause a complete disengagement of the clutch teeth 51 and the clutch teeth 47 thereby eliminating any further driving engagement between the shaft 40 and the tap spindle 71. As soon as this disengagement takes place, the tap spindle will, of course, cease rotation and, consequently, cease its upward movement thereby discontinuing further upward movement of the rod 83. As a result of this construction, the taper shank 19 and drive shaft 18 may continue to rotate, driving the gear 25, countershaft 36, idler gear 45 and collar gear 41 without causing any rotation whatsoever of the shaft 40 or tap spindle 71.

The stop member 85 also is engaged on its underside by one end of a lever 95 mounted for pivotal movement on a suitable pin 96. The upper side of the opposite end of this lever 95 is engaged by an arm 97 secured to an armature 98 of a suitable solenoid 99. Current is supplied to the solenoid from any suitable source (not shown) through a micro-switch 100 of conventional construction. This switch is clearly illustrated in Figure 2 of the drawings. The circuit to the solenoid may be closed by depressing the button 101. This is accomplished by means of the exterior push button 102 which engages a leaf spring 103 secured to the housing by suitable screws 104, the opposite end of the leaf spring engaging the plunger 101 which, when depressed, serves to close the circuit to the solenoid.

The switch 100 is of such construction that when the plunger 101 is depressed the circuit will remain closed until the plunger 105 projecting from the opposite side of the switch 100 is depressed. This plunger 105 engages the exterior surface of a vertically slidable control rod 107 which is provided with a cam surface 108 thereon which, as is clearly seen in Figure 2 of the drawings, serves to depress the plunger 105 when the control rod 107 is moved downwardly.

As is seen in Figures 1 and 2, the control rod 107 has surrounding its upper end a compression coil spring 109 confined between a pin 110 extending through the rod and the adjacent wall of the housing in which the rod 107 is slidably mounted. This compression coil spring 109 constantly tends to urge the rod 107 upwardly. The rod 107 extends downwardly through the housing and is slidably mounted in the boss 84 which serves also to provide means for slidably mounting the follower rod 83. The rod 107 has mounted thereon a stop member 112 which lies in the path of movement of a stop collar 113 secured to the rod 83 by means of a set screw 114.

From the above description, it will be clear that in order to operate the tapping machine described above the plunger 102 may be manually depressed by the operator. Depressing this plunger will, through the medium of the leaf spring 103, depress the plunger 101 closing the circuit of the solenoid 99. The energizing of this solenoid will cause a downward movement of the armature 98 and consequent downward movement of the lefthand end of the lever 95 as viewed in Figure 12 of the drawings. This downward movement of the solenoid armature 98 will cause a corresponding upward movement of the righthand end of the lever 95 engaging the stop member 85 and causing a corresponding upward movement of the rod 86 carrying the fork 88. Upward movement of the fork 88 will cause a corresponding vertical movement of the clutch collar 49 associated therewith establishing a driving engagement between the clutch teeth 50 and the clutch teeth 26. Engagement of these clutch teeth establishes a direct driving engagement between the shaft 18 and the shaft 40 and causes the shaft 40 to be rotated by the shaft 18 in the same direction as the rotation of the shaft 18. Inasmuch as the tap spindle 71 is drivingly interconnected by means of the splines 70 to the lower end of the shaft 40, this driving connection will cause forward rotation of the tap spindle 71.

Due to the engagement between the threads on the exterior surface of the tap spindle and the threads of the lead nut assembly, rotation of the tap spindle in this forward direction will cause the tap spindle to be fed downwardly toward the work at a rate commensurate with the lead of the particular tap for which the lead screw assembly was designed. This downward feed of the tap and tap spindle will obviously continue until the tap spindle has reached a predetermined desired depth of cut. This depth of cut is controlled by the adjustable collar 113 adjustably secured to the shaft 83 by means of the set screw 114.

In view of the fact that the fork 81 and rod 83 are carried downwardly with the tap spindle, the rod 83 will move downwardly with the tap spindle and will carry with it the collar 113. When the collar 113 has moved downwardly sufficiently far to engage the stop collar 112 carried by the rod 107, further downward movement of the tap spindle will produce a corresponding downward movement of the rod 107. As is clearly seen in Figure 2 of the drawings, downward movement of the rod 107 will, due to the cam surface 108 thereon, cause the plunger 105 of the micro-switch 100 to be depressed, opening the circuit to solenoid 99 and de-energizing the same. When the solenoid 99 is de-energized, the compression coil spring 87 will force the rod 86 downwardly and force the righthand end of the lever 95 downwardly thereby raising the armature of the solenoid to its original position. At the same time, downward movement of the rod 86 will cause a corresponding downward movement of the fork 88 and its associated clutch collar 49, disengaging the clutch teeth 50 from the clutch teeth 26 and forcing the clutch teeth 51 into engagement with the clutch teeth 47.

This downward movement of the clutch, as has been described above, will now establish a driving engagement between the shaft 18 and the shaft 40 through the gear cluster 36, idler gear 45, and collar gear 41 thereby causing the shaft 40 to rotate in the reverse direction or, rather, in a direction opposite to the direction of rotation of the shaft 18. This reversal of the direction of drive of the tap spindle will cause the tap spindle to move upwardly and as it moves upwardly, it will cause a corresponding upward movement of the rod 83. As has been described above, when the rod 83 approaches the upper end of its movement, its upper end will engage the stop member 85 and move the rod 86 upwardly against the force of the coil spring 87 a distance sufficient to cause disengagement of the clutch teeth 51 and 47, thereby severing any driving connection between the shaft 18 and the shaft 40. At this point, it will be appreciated that the cycle of operation of the machine is now complete and the cycle may be repeated merely by depressing the plunger 102.

A modified form of the invention is illustrated in Figures 7, 8, and 9 of the drawings. This modified form of the invention embodies substantially all of the salient features of the construction above described, but is primarily designed and intended for tapping extremely deep holes or for use in a tapping operation where the length of the axial movement of the tap spindle is considerably greater than is normally required. In this form of the invention, a modified form of lower collar assembly 120 is employed which lower collar is provided with outwardly extending bosses 121 carrying bearings 122 mounted for axial sliding movement in the bearings 122 and shafts 123 which are anchored to a follower plate 124 in which the lower portion of the tap spindle is journalled for rotation in any suitable fashion.

This construction provides an outboard support for the tap spindle when the same is extended beyond the range of movement required in a normal tapping operation. As is clearly seen in Figure 7, this construction permits the elimination of the fork 81 and the control rod 83 may be bolted directly to a suitable projection 125 on the follower plate 124. In other respects, the construction of this modified form of tapping head may be substantially as described above in connection with the preferred form of the invention.

Figure 11 is a diagrammatic view of a circuit by means of which a plurality of tapping heads or tapping machines may be simultaneously operated. The peculiar advantage of this assembly embodying tapping heads or machines of the type herein described resides in the fact that a plurality of holes of different depths and having different pitch threads may simultaneously be tapped if desired, inasmuch as each tapping head or machine operates entirely independently of each of the others and operates substantially automatically once its cycle of operation has been started.

In the circuit diagram, 130 represents one side of the electric circuit and 131 represents the opposite side. A master switch 132 may serve to energize a master relay 133. This master relay serves to simultaneously close switches 134, 135, and 136, each associated with one of the tapping heads. Closure of the switch 134 serves to energize a secondary relay 137, close the switch 138, energize the solenoid 139. Similarly, closing of the switch 135 energizes the secondary relay 140 and closes the switch 141, energizing the solenoid 142; likewise, closing the switch 136 energizes the secondary relay 143, closing the switch 144 and energizing the solenoid 145. It will be seen that, as a result of this construction, closure of the master switch 132 will serve to set into operation a plurality of tapping heads. Each of the tapping heads will automatically be fed downwardly to tap the hole required to the predetermined depth for which that particular tapping head may be set. In each instance, when the predetermined depth of hole has been reached, each individual tapping head will reverse its direction of travel and return to its original position entirely independently of the operation of the remaining tapping heads in the circuit. This construction is particularly advantageous where it is desired to perform several tapping operations on a single workpiece wherein the holes to be tapped may be of entirely different depth and different pitch threads, yet at the same time the entire tapping operation of all holes necessary may be accomplished simultaneously.

As has hereinbefore been pointed out, the above description and disclosure of the drawings relates solely to a tapping head construction adapted for attachment to a drill press, turret lathe, or other machine tool. It will, however, be obvious to those skilled in the art that a great many of the novel features and important improvements herein disclosed may equally well be embodied in a machine designed and built solely for the purpose of tapping holes. The invention herein disclosed, therefore, contemplates the inclusion not only of the novel and specific features described above, but also contemplates substantial modifications thereof falling within the scope of the invention as defined in the following claims.

What is claimed is:

1. In a device for tapping threads including a drive shaft, an axially reciprocable lead screw controlled tap spindle, reversing gearing and axially shiftable clutch means serving to interconnect said drive shaft with said tap spindle either directly or through said reversing gearing, a control rod interconnected with said tap spindle for axial movement therewith, and means interconnecting said control rod with said clutch mechanism whereby to actuate said clutch in accordance with the axial position of said tap spindle.

2. Tapping apparatus, including in combination, a drive shaft, a tap spindle, reversing gearing, axially shiftable clutch mechanism serving to establish a driving connection between said shaft and tap spindle either directly or through said reversing gearing, said tap spindle being axially movable, lead screw mechanism for controlling the axial position of said tap spindle, a control rod connected to said tap spindle and axially movable therewith, and means operatively interconnecting said control rod and said clutch mechanism serving to shift said clutch when said tap spindle reaches a predetermined axial position.

3. In a tapping machine construction, a tap spindle including a chuck for mounting a tap therein, said spindle being externally threaded, said thread having a lead corresponding to the lead of the thread of the tap, said tap spindle being hollow and internally splined throughout at least a portion of its length, and an externally splined shaft for driving said tap spindle telescoping therein.

4. A tapping machine construction comprising in combination, a drive shaft, a tap spindle, a reversing gear assembly, clutch means serving to drivingly interconnect said drive shaft with said tap spindle either direct or through said reversing gear assembly, and means including a rod movable with said tap spindle for actuating said clutch means in accordance with the axial position of said tap spindle.

5. In a tapping machine having a drive shaft, a tap spindle and reversing gearing, an axially shiftable clutch serving to establish a driving connection between said shaft and spindle either directly therebetween or through said reversing mechanism, a solenoid serving to effect axial movement of said clutch in one direction and an axially shiftable control rod associated with said tap spindle serving to effect axial shifting of said clutch in the opposite direction.

6. A tapping machine construction including a housing, a drive shaft journalled for rotation in said housing, clutch teeth on one axial face of said drive shaft, an intermediate shaft coaxially arranged with respect to said drive shaft, a tap spindle splined to said intermediate shaft for rotation therewith and for axial movement with respect thereto, a collar rotatable on and coaxially arranged with respect to said intermediate shaft, reversing gearing drivingly interconnecting said collar and said drive shaft to drive the same in a direction opposite to the direction of rotation of said drive shaft, clutch teeth on one axial face of said collar and an axially shiftable clutch member slidable on and drivingly interconnected with said intermediate shaft and having a series of clutch teeth on each of the axial faces thereof, one set of said clutch teeth being adapted to engage the clutch teeth on the axial face of said drive shaft and the other set of clutch teeth being adapted to engage the clutch teeth on the axial face of said collar.

7. A tapping machine construction including a housing, a drive shaft journalled for rotation in said housing, clutch teeth on one axial face of said drive shaft, an intermediate shaft coaxially arranged with respect to said drive shaft, a tap spindle splined to said intermediate shaft for rotation therewith and for axial movement with respect thereto, a collar rotatable on and coaxially arranged with respect to said intermediate shaft, reversing gearing drivingly interconnecting said collar and said drive shaft to drive the same in a direction opposite to the direction of rotation of said drive shaft, clutch teeth on one axial face of said collar, an axially shiftable clutch collar slidable on and drivingly interconnected with said intermediate shaft and having a series of clutch teeth on each of the axial faces thereof, one set of said clutch teeth being adapted to engage the clutch teeth on the axial face of said drive shaft and the other set of clutch teeth being adapted to engage the clutch teeth on the axial face of said collar, a fork for axially shifting said clutch collar, and means interconnecting said tap spindle and fork serving to shift said clutch collar when said tap spindle has reached a predetermined axial position.

8. A tapping machine construction including a housing, a drive shaft journalled for rotation in said housing, clutch teeth on one axial face of said drive shaft, an intermediate shaft coaxially arranged with respect to said drive shaft, a tap spindle splined to said intermediate shaft for rotation therewith and for axial movement with respect thereto, a collar rotatable on and coaxially arranged with respect to said intermediate shaft, reversing gearing drivingly interconnecting said collar and said drive shaft to drive the same in a direction opposite to the direction of rotation of said drive shaft, clutch teeth on one one axial face of said collar, an axially shiftable clutch collar slidable on and drivingly interconnected with said intermediate shaft and having a series of clutch teeth on each of the axial faces thereof, one set of said clutch teeth being adapted to engage the clutch teeth on the axial face of said drive shaft and the other set of clutch teeth being adapted to engage the clutch teeth on the axial face of said collar, a fork for axially shifting said clutch collar, a control rod operatively connected to said tap spindle and movable axially therewith, and means on said control rod adapted to engage said fork whereby to effect shifting of said clutch collar when said tap spindle reaches a predetermined axial position.

SVEN B. HELLSTROM.